United States Patent [19]

Farley

[11] 3,795,430

[45] Mar. 5, 1974

[54] WEAR RESISTANT FRICTIONALLY CONTACTING SURFACES

[75] Inventor: Carl Wiern Farley, Hockessin, Del.

[73] Assignee: E. I. duPont de Nemours and Company, Wilmington, Del.

[22] Filed: Oct. 19, 1972

[21] Appl. No.: 298,837

[52] U.S. Cl. ................................. 308/241, 75/171
[51] Int. Cl. ........................................... F16c 33/12
[58] Field of Search ....................... 308/241; 75/171

[56] References Cited
UNITED STATES PATENTS

| | | | |
|---|---|---|---|
| 3,589,894 | 6/1971 | Roush | 75/171 |
| 3,591,372 | 7/1971 | Hockin et al. | 75/171 |
| 3,595,710 | 7/1971 | Lambert et al. | 75/171 |
| 3,562,024 | 2/1971 | Smith | 75/171 |
| 3,127,224 | 3/1964 | Owens et al. | 308/241 |

*Primary Examiner*—Charles J. Myhre
*Assistant Examiner*—Barry Grossman

[57] ABSTRACT

An improved mechanical system comprising a first part presenting a first metallic surface, a second part presenting a metallic surface of the same or a different metal and capable of being in sliding contact with the first surface, and means for inducing and maintaining the two surfaces in sliding contact with each other, for example, in liquid pumps of the gear type wherein there is sliding and rolling between the teeth of adjacent meshing and unmeshing gears, the improvement consisting of employing as each surface a metallic surface comprising an alloy containing at least 60 atom percent of at least two heavy metal transition elements, the ratio of the atomic radii of the largest to the smallest transition elements being 1.05–1.68, and consisting of 10–100 volume percent of a hard phase and 0–90 volume percent of a matrix phase which is softer than the hard phase, said hard phase containing a major fraction of Laves phase in such amount as to provide at least 10 volume percent thereof in the alloy.

14 Claims, No Drawings

WEAR RESISTANT FRICTIONALLY CONTACTING SURFACES

BACKGROUND OF THE INVENTION

1. Field of the Invention

This invention relates to metallic mechanical systems comprising two opposing surfaces maintained in frictional contact with each other.

2. Description of the Prior Art

In mechanical systems which comprise one part presenting a surface in sliding contact with a surface presented by another part during systems operation, the contacting surfaces are subject to damage and wear, especially under boundary lubricating conditions. In such systems, the sliding contacts generally involve different metals since opposing surfaces of like metals tend to weld together and then separate, causing spalling and rapid wear of both surfaces. Examples of mechanical systems employing different metals include those wherein a shaft slides axially through or rotates against a cylindrical bearing or seal and wherein roller bearing rollers are in sliding contact with a load-supporting surface. In many of these mechanical systems, the contacting surfaces (sliding couples) are employed with a wide variety of environmental fluids, many of which are relatively poor lubricants, for example, water, wet steam and organic liquids, such as silicone oils, organic phosphates and hydrocarbons.

Mechanical systems involving surfaces of metallic materials in sliding contact may exhibit tendencies to be damaged and to seize at high temperatures. Such systems can be found in turbojet engines where sliding contact is provided by parts sliding and rotating against bearings in such sub-assemblies as turbine shafts wherein shafts rotate inside journal bearings, valves wherein valve bodies slide against mating surfaces in their opening and closing motions and afterburner gates which turn on cylindrical bearings sliding around shafts or on shafts rotating inside cylindrical bearings. Such high temperature conditions can also arise inadvertently in roller bearings when they lose lubricant and become subject to seizure.

Alloys comprising Laves phases dispersed in softer matrix phases are known to be useful in certain instances for providing one of two surfaces which are in sliding contact with each other, for example, as disclosed in U.S. Pat. Nos. 3,507,775 and 3,513,084. In some cases, however, the use of Laves phase-containing alloys against other types of metallic materials results in unacceptable surface damage accompanied by great wear of the alloys.

SUMMARY OF THE INVENTION

It is an object of this invention to provide mechanical systems having sliding contacting surfaces which are resistant to damage or wear under a variety of lubricating and non-lubricating conditions, including operation at temperatures up to 1,093° C. Another object is to provide mechanical systems having sliding contacting surfaces which exhibit uniform coefficients of thermal expansion and common elastic properties and which are resistant to corrosion of the type produced by galvanic action between dissimilar, contiguous metallic surfaces. In summary, the present invention resides in an improvement in a system capable of mechanical operation and comprising two parts having metallic surfaces designed to be in repeating sliding contact with each other and means for inducing and maintaining the surfaces in sliding contact with each other during operation of the system, the improvement consisting of such a system wherein each metallic surface comprises a metallic surface comprising an alloy containing at least 60 atom percent of at least two heavy metal transition elements, the ratio of the atomic radii of the largest to the smallest of the heavy metal transition elements being in the range 1.05–1.68, and consisting of 10–100 volume percent of a hard phase and 0–90 volume percent of a matrix phase which is softer than the hard phase, said hard phase containing a major fraction of Laves phase in such amount as to provide at least 10 volume percent thereof in the alloy.

DETAILED DESCRIPTION OF THE INVENTION

It has been found that when both surfaces of a sliding contact are composed of the same kind of alloy as defined herein, the surfaces suffer little wear. In many cases, the coefficients of friction of such alloys against themselves are surprisingly low, often less than against conventional bearing materials. Further, the sliding contacts characterized by surfaces of alloys as defined hereinafter are operable at temperatures up to 1,093° C. without significant damage taking place at the surfaces.

This invention is applicable to a wide variety of mechanical systems characterized by two or more parts in sliding contact with each other during system operation, including operation in the absence of a lubricant, in the presence of a non-lubricating fluid, and in the presence of a lubricating fluid under boundary lubricating conditions. Boundary lubrication can exist when sliding speeds are so low and contact pressures so high that the existence of load-supporting hydrodynamic wedges of lubricant is physically impossible. According to the invention, each surface in sliding contact comprises an alloy as defined hereinafter. Either part can be movable or fixed in place provided that at least one in each couple is movable, that is, able to move in sliding contact with the other. In the description which follows, the surfaces in moving or operational contact with each other are referred to as sliding couples. Sliding couples can exist in roller bearing assemblies between load-bearing rollers and the supporting surface over which they roll. Maintenance of movement between the surfaces can be by a variety of means. Included are such means that can provide timed, intermittent sliding contact between surfaces of two moving cooperating parts, that can provide oscillatory or reciprocatory sliding contact between two parts, only one of which may be moving, and that can provide sliding contact between one surface in a repeated circular sliding motion along the other surface.

In accordance with this invention, the alloy based surfaces in the mechanical system can be provided in any known, convenient suitable manner. For example, they can be the surfaces of parts which are made entirely from the alloy. They can be separately preformed alloy layers mechanically attached to underlying surfaces or bonded thereto according to known techniques. They can be obtained by thermal diffusion of the alloy onto the base part by known techniques, for example, as disclosed in U.S. Pat. No. 3,331,700. Other known processes for obtaining the alloy based surfaces include weld overlaying, plasma arc spraying, powder metallurgy and casting. Surfaces of Laves phase-containing alloys should be sufficiently deep to allow for the wear acceptable to the mechanical system in which they are used. As a coating, this thickness usually is 0.001–0.40 inch, according to the size of the mechanical system in use, preferably, 0.002–0.03 inch. Overlays anchored by welding or mechanical attachment usually are at least 0.125 inch.

It is essential that the alloy compositions of the surfaces which are in sliding contact with each other comprise a hard phase containing a major amount of a Laves phase as disclosed above. In most alloys comprising a hard phase and a soft phase the hard phase is substantially all Laves phase. In some alloys the hard phase contains a major fraction, that is, greater than 50 volume percent, of Laves phase and a minor fraction, that is, less than 50 volume percent of another hard phase which accompanies the Laves phase, often surrounding it. For example, in certain alloys consisting essentially of Co, Mo, Si and Cr, especially when the Cr content is at least 12 weight percent, the Laves phase is surrounded by another hard phase. The surround is present as a minor fraction, usually less than 25 volume percent, of the hard phase. A Laves phase contains one or more metallographical constituents that have the $C_{14}$ (hexagonal), $C_{15}$ (cubic) or $C_{36}$ (hexagonal) crystal structure as described in "International Tables for X-Ray Crystallography," Symmetry Groups, N. F. M. Henry and K. Lonsdale, International Union of Crystallography, Kynoch Press, Birmingham, England (1952). Prototypes of the Laves phase crystal structures are, respectively, $MgZn_2$, $MgCu_2$ and $MgNi_2$. Such phase structures are unique crystal structures that permit the most complete occupation of space by assemblages of two sizes of spheres. Fundamentally, the Laves phase can be represented by the formula $AB_2$, the large atom A occupying certain sets of crystallographic sites and the small atoms B occupying other sites, in which the ratio of atomic radii A:B is in the range 1.05–1.68. Laves phases occur as intermediate phases in numerous alloy systems. Laves phases generally have a homogeneity range, that is, they can have any of a range of elemental compositions while maintaining their characteristic crystal structure. The atom ratio B:A can vary from slightly less to slightly more than 2, possibly the result of some vacant sites in the crystal structure. Also, more than one kind of atom can occupy the large atom sites, the small atom sites, or both. Such Laves phases can be represented stoichiometrically by the formula $(A_{1-x}C_x)(B_{1-y}D_y)_2$ where C represents the atoms of one or more kinds that substitute for the large atoms, D represents the atoms of one or more kinds that substitute for the small atoms, of the binary Laves formula $AB_2$, and $x$ and $y$ have values in the range 0–1.

An alloy, as the term is used herein, is a substance having metallic properties and containing in its elemental composition two or more chemical elements of which at least two are metals; other elements can be present. A heavy metal transition element is a metal selected from the group consisting of Fe, Co, Ni, Ru, Rh, Pd, Os, Ir, Pt, Mn, Re, Cr, Mo, W, U, V, Nb, Ta, Ti, Zr, Hf, Th, Sc, Y, La, Zr and Ce.

Numerous binary and higher Laves phases which are suitable for purposes of the invention and contain at least two heavy transition metals are disclosed in the prior art. For example, binary and ternary Laves phases are shown in "Alloy Chemistry of Transition Elements," M. V. Nevitt, pages 101–178, especially Tables XIII and XIV, appearing in "Electronic Structure and Alloy Chemistry of the Transition Elements," P. A. Beck, Interscience — Wiley, New York, N. Y., 1963. Typical alloys consisting largely or entirely of ternary and higher Laves phase are disclosed in Table I.

TABLE I

Alloys $Ti_{30}Mn_{50}Si_{14}$
TiFeSi
$Ti_2Ni_3Si$
$V_4Co_5Si_3$
$V_4Ni_5Si_3$
$Nb_3Cr_5Si_2$
$Nb_2Ni_3Si$
$Ta(Cr,Co)_2$
$Ta(Cr,Cu)_2$
$Ta_2Ni_3Si$
$Ta(V,Mn)_2$
MoFeSi
$Mo_2Fe_3Si$
MoNiSi
$Mo_2Ni_3Si$
MoCoSi
$Mo_2Co_3Si$
$Mo_{25}Mn_{47.5}Si_{27.5}$
$W_2Mn_3Si$
WFeSi
$W_{40}Fe_{50}Si_{10}$
WCoSi
$W_2Co_3Si$
WNiSi
$W_2Ni_3Si$
$Mn_3Co_3Si_2$
$Mn_3Ni_3Si_2$
$Zr(V,Fe)_2$
$Zr(V,Co)_2$ Generally, in the hard phase-containing alloys useful in this invention the transition metal elements are selected from the group consisting of V, Hf, W, Ta, Nb, Mo, Ni, Co, Fe, Mn, Cr, Zr and Ti. Preferably, the hard phase-containing alloy consists essentially of a substantial amount of at least one metal A, a substantial amount of at least one metal B and Si, metal A being selected from Mo and W and metal B being selected from Fe, Cr, Co and Ni, the sum of the amounts of metals A and B being at least 60 atom percent of the alloy, the amount of Si and the relative amounts of metals A and B being such as to ensure that 10–100 volume percent of the alloy is hard phase, the hard phase being distributed in a relatively soft matrix of the remaining 0–90 volume percent of the alloy. More preferably, 20–85 volume percent of the hard phase (containing at least 75 volume percent, and preferably, substantially all Laves phase) is distributed in 15–80 volume percent of matrix material. The matrix can be formed of the same alloy system as the hard phase; it can be a single metal, a solid solution, one or more intermetallic compounds other than Laves phase or a mixture of solid solution and said intermetallic compounds. It must be softer than the hard phase and, generally, should have no more than about 50 percent of the Knoop hardness of the hard phase. Preferred metal matrix phases exhibit a Knoop hardness of 350–750.

Cobalt based alloys useful herein and having the requisite amount of hard (including Laves) phase include those disclosed in U.S. Pat. Nos. 3,180,012 and 3,410,732. Alloys containing silicon and at least two heavy transition elements selected from the group consisting of Mo, Co, W, Ni and Cr include those disclosed in U.S. Pat. No. 3,361,560.

Other hard, substantially 100 percent Laves phase-containing alloys useful herein include those disclosed in Tables II and III (the latter preferred) wherein the elements are expressed in weight percent and the hard phases are expressed in volume percent.

TABLE II

| Co | Ni | Mo | Si | Fe | Mn | Other | Hard Phase |
|---|---|---|---|---|---|---|---|
|  |  | 52 | 18 | 30 |  |  | 70 |
|  |  | 36 |  | 46 |  | 18 Ge | 50 |
|  | 10 | 36 | 18 | 36 |  |  | 60 |
|  |  |  | 15 |  | 58 | 27 Ta | 35 |
|  | 45 |  | 15 |  |  | 40 Nb | 28 |
| 38 |  |  | 10 |  |  | 52 Ta | 35 |
| 60 |  |  | 10 |  |  | 30 Ti | 25 |
| 45 |  | 48 | 7 |  |  |  | about 100 |
| 32 |  | 52 | 16 |  |  |  | about 100 |

TABLE III

| Co | Ni | Mo | W | Si | Cr | C | Hard phase | Knoop hardness Hard phase | Matrix |
|---|---|---|---|---|---|---|---|---|---|
| 59.7 |  | 27.9 |  | 4.0 | 7.9 | 0.5 | 60 | 1,481 | 569 |
| 57.6 |  | 27.8 |  | 2.0 | 12.0 | (¹) | 40 | 920 | 450 |
| 62.0 |  | 28.0 |  | 2.0 | 8.0 | (²) | 40 | 1,481 | 735 |
| 70 |  | 28 |  | 2 |  |  | 20 | 1,039 | (³) |
| 65 |  | 25 |  | 10 |  |  | 50 | 1,039 | (³) |
| 65 |  | 29 |  | 6 |  |  | 50 | 1,039 | (³) |
| 65 |  | 33 |  | 2 |  |  | 50 | 1,039 | (³) |
| 60 |  | 30 |  | 10 |  |  | 58 | 1,220 | (³) |
| 60 |  | 34 |  | 6 |  |  | 65 | 950 | (³) |
| 60 |  | 38 |  | 2 |  |  | 50 | 1,039 | (³) |
| 55 |  | 35 |  | 10 |  |  | 65 | 1,231 | (³) |
| 55 |  | 39 |  | 6 |  |  | 78 | 1,200 | (³) |
| 55 |  | 41 |  | 4 |  |  | 85 | 954 | (³) |
| 55 |  | 43 |  | 2 |  |  | 75 | 900 | (³) |
| 50 |  | 48 |  | 2 |  |  | 76 | 1,443 | (³) |
|  | 55 | 35 |  | 10 |  |  | 65 | 824 | 316 |
|  | 53 | 35 |  | 3 | 9 |  | 55 | 1,170 | 370 |
|  | 40 |  | 51 | 9 |  |  | 45 |  |  |
| 40 |  |  | 45 | 15 |  |  | 35 |  |  |
| 50 |  | 44 |  | 6 |  |  | 75 |  |  |
|  | 58 | 35 |  | 7 |  |  | 80 |  |  |

¹ 0.6 Mn instead of carbon.
² 0.01 B and 0.2 Zr instead of carbon.
³ Less than that of the hard phase; generally, 350–750.

In a sliding couple, each surface is either 100 percent of the defined alloy or is a mixture of the alloy and a binder which binds the alloy in place without destroying its Laves phase. Such binders can be selected from metals and resins. Metals can be selected from heavy metal transition elements, copper, silver and gold, as well as from alloys of these metals. Typical binder metals include nickel, cobalt, iron, bronze and selected iron alloys. Resins include phenolic resins and essentially linear resins having a second order transition temperature (as determined by plots of flexural modulus versus temperature) of at least 250° C. and a room temperature modulus of at least 300,000 p.s.i., for example; phenol-formaldehyde resins, aromatic polyimides, aromatic polyamides, aromatic polyketones, aromatic polythiazoles and polybenzotriazoles. Binders should be inert to, that is, nonreactive with, and softer than the Laves phase of the alloys they bind. The binder can comprise up to 90 percent of the mixture of binder and alloy. The opposing surfaces of the sliding couple can consist of the same or different alloys; moreover, the amounts of binder, if present, can be the same or different. It is preferred that the opposed surfaces present Laves phases containing a common heavy metal transition element.

Although the defined alloys are widely useful in mechanical systems of the type described herein and in the presence of a wide variety of fluids, not all alloys are equivalent and not all are fully satisfactory in the presence of all fluids. However, given a particular fluid, alloys can be chosen to provide satisfactory results. Mechanical systems containing the defined alloys as opposing surfaces in sliding contact can be used in many instances in the absence of a lubricating agent, that is, they are self-lubricating. Self-lubrication is valuable in systems which can lose lubricating agent from between the sliding parts, for example, in meshed gears and cam arrangements on long standing, and in systems which become too hot for effective lubrication, such as at the pivots of the skirts in the iris of a turbojet afterburner assembly.

The mechanical systems of this invention also are operable in the presence of non-lubricating fluids, such as water, wet steam, hydraulic fluids, silicone oils or other fluid media, to which the sliding couple may be exposed. Alloy based surfaces of this invention also are useful with poor lubricants. This invention has practical utility in sliding contacts in hydraulic actuating mechanisms wherein a piston or piston ring is in sliding contact with its enclosing cylinder, in chemical process valves of the gate, plug or ball type wherein the gate, plug or ball slides against its enclosure when turned to an "on" or "off" position, and in liquid pumps of the gear type wherein there is sliding and rolling between the teeth of adjacent meshing and unmeshing gears, wherein there is sliding contact between the peaks of gears and the pump shells, and wherein there is rotary sliding contact between the radial faces of the gears and their retaining faces.

There are many mechanical systems of the type described herein where the sliding couples are in contact with a lubricating fluid and which in use develop conditions characterized by boundary lubrication. The couples of the invention can afford a service life well beyond what generally can be expected under such conditions. Boundary lubrication can be typified in sliding couples which are loaded along their axis, as in thrust bearings, which are loaded across their axis, as in journal bearings, which are loaded in periodic engaging contacts, such as between gear teeth of spur, helical, herringbone, bevel, worm or hypoid type gears, and which are loaded in motion-converting slides, such as in cams. Where hydrodynamic rather than boundary lubrications prevail, excellent service life of the sliding contact can be expected.

Such sliding couples as provided by this invention perform well at temperatures in the range 204°–1,093° C. and at a pressure-sliding contact of 500–3,000 p.s.i. As long as the alloys and any binders are maintained as distinct solid phases, that is, below their fusion points, operation can be carried out at temperatures in excess of 1,093° C. The sliding couples can function without added lubricants between the sliding surfaces; they are believed to provide their own lubricant in the form of oxides resulting from contact with ambient air. Surface roughness changes under such conditions are due to oxidation rather than to surface damage.

In the following runs, percentages are by weight unless otherwise noted. The alloys which are designated by letters have the following compositions:

A. An alloy of 55 percent cobalt, 35 percent molybdenum and 10 percent silicon, of which 65 percent by volume is Laves phase and 35 percent by volume is matrix phase.

B. An alloy of 62 percent cobalt, 28 percent molybdenum, 8 percent chromium and 2 percent silicon, of which 50 percent by volume is Laves phase and 50 percent by volume is matrix phase.

C. A mixture of 80 percent of alloy A and 20 percent nickel. The nickel is a binder for the alloy when the mixture is sintered.

D. A steel designated AISI 52100 and having the composition 1 percent carbon, 1.45 percent chromium, 0.3 percent silicon, 0.3 percent manganese and the balance iron. It is commonly used for wear resistant pump shafts against bronze bushings.

E. A steel designated AISI 4340 and typically having the composition 0.4 percent carbon, 0.7 percent manganese, 0.3 percent silicon, 1.8 percent nickel, 0.75 percent chromium, 0.25 percent molybdenum and the balance iron. It is a material commonly used for wear resistant pump shafts against bronze bushings.

F. A carbon steel designated AISI 1095 and having the composition 0.95 percent carbon, 0.4 percent manganese, 0.25 percent silicon and the balance iron and impurities. It is a commonly used material in sliding contact applications against bronzes.

G. M2 tool steel, having the composition 0.85 percent carbon, 4 percent chromium, 2 percent vanadium, 6.25 percent tungsten, 5% molybdenum and the balance iron. It is commonly used as a pump shaft material against bronzes.

H. Stellite 6B, a cobalt based metal having the composition 29 percent chromium, 2.2 percent nickel, 1.9 percent silicon, 2.6 percent iron, 2 percent manganese, 1.5 percent molybdenum, 4.5 percent tungsten, 1.2 percent carbon and the balance cobalt. It is a metal very commonly used in wear resistant sliding contact applications against ductile metals such as bronzes and it is sometimes used in rollers of roller bearings.

J. Hastelloy X, a nickel alloy having the composition 22 percent chromium, 20 percent iron, 9 percent molybdenum, 0.15 percent carbon and the balance nickel. It is a metal often used in high temperature sliding contacts against bronzes.

K. SAE 62, a lead-tin bronze having the composition 83 percent copper, 7 percent lead, 7 percent tin and 3 percent zinc. It is a frequently used bearing material in rotary pump applications against surfaces of steels, conventional nickel and cobalt alloys and the aforesaid alloys D, E, F, G, H and J.

L. SAE 660, a tin bronze having the composition 88 percent copper, 10 percent tin and 2 percent zinc. It is a frequently used bearing material in pumps against surfaces of alloys such as the aforesaid D, E, F, G, H and J.

The above materials in various combinations were evaluated in a test which involves rubbing opposing surfaces of metals against one another in the absence of lubricant, in the presence of fluids which normally are poor lubricants, and in the presence of conventional lubricants under boundary lubricating conditions. The tests were carried out by rubbing ⅜ inch diameter solid pins, of selected compositions and having polished flat ends, against 1 inch by 2 inch flat surfaces of selected compositions, the pin ends being loaded to particular pressures during a program of times and temperatures. During the rubbing tests, each pin was drawn back and forth at an average of a sinusoidally variable speed in one half inch strokes while the pin end was in loaded, constant and complete contact with the flat surface. Profilometer measurements of the tracks of sliding contacts on the flat surfaces, measured before and after rubbing tests, are reported as CLA values. CLA is the arithmetic average, in microinches, of deviations from a plane along a line of measurement across the direction of sliding contact. Visual ratings, where determined, were based on observations of 6.6X photographs of tracks rubbed by the pins and of direct 10X viewing of the tracks using the scale:

1. No visible score marks
2. A few visible score marks
3. Continuous grooving.
4. Signs of seizure or transverse microcracks.

Runs 1–14

In these runs, testing was carried out under boundary lubrication conditions. Two pins were machined from each of alloys A, C, D, G, H, K and L. Seven separate 0.25 inch by 1 inch by 2 inch coupons of 410 stainless steel were plasma sprayed with 0.015 inch coatings of alloy A and seven with 0.015 inch coatings of alloy C. All coatings were sintered and then ground to a thickness of 0.004–0.008 inch. One pin of each given alloy was rubbed against a coupon with alloy A coating and one was rubbed against a coupon with alloy C coating. Prior to the rubbing tests, the coated surface profiles of all the coated coupons were measured with a profilometer. The pins were rubbed against the flat surfaces at 5 feet per minute average velocity while the pin end loading was 1,000 p.s.i. and while the contact area was submerged in a 10W-40 base hydrocarbon oil. The system was operated at room temperature until the friction was constant, requiring on the average about 15 minutes. Thereafter, the system was heated to 38° C. and run for 5 minutes at that temperature. At 28° C. intervals, this procedure was repeated until 204° C. was reached. At 204° C. the test was continued for 30 minutes. The system was then cooled and the coated coupon and pin specimens were removed and, to drive off the oil, heated to 232° C. for 24 hours. The surface profile of the friction path on each coated coupon was again measured with a profilometer to determine the amount of surface damage produced. The friction paths were also rated visually.

Table IV shows the sliding couples tested, CLA values of the coated coupons before and after friction exposure, and the visual ratings of the rubbed coupon portions after the friction test.

TABLE IV

Performance in Oil

| Run No. | Pin Alloy | Flat Face Alloy | CLA Before Test | CLA After Test | Visual Rating |
|---|---|---|---|---|---|
| 1 | A | A | 9.5 | 12.0 | 1 |
| 2 | C | A | 9.5 | 10.0 | 1 |
| 3 | D | A | 8.0 | 10.0 | 1 |
| 4 | G | A | 9.0 | 9.0 | 1 |
| 5 | H | A | 9.5 | 26.0 | 4 |
| 6 | K | A | 10.0 | 14.5 | 2 |
| 7 | L | A | 10.0 | 9.5 | 1 |
| 8 | A | C | 8.0 | 8.0 | 1 |
| 9 | C | C | 8.0 | 9.0 | 1 |
| 10 | D | C | 9.2 | 10.5 | - |
| 11 | G | C | 10.0 | 15.0 | 1 |
| 12 | H | C | 11.0 | 12.0 | 3 |
| 13 | K | C | 9.0 | 9.0 | 2 |
| 14 | L | C | 9.0 | 14.5 | 1 |

It can be seen that under boundary lubrication conditions, the surface properties of Laves phase-containing alloys rubbed by Laves phase-containing alloys (Runs 1, 2, 8 and 9) are equivalent to those rubbed by commonly used steels (Runs 3, 4, 10 and 11), are equivalent or superior to those rubbed by conventional machine construction cobalt based alloys (Runs 5 and 12) and are equivalent or superior to those rubbed by commonly used bronzes (Runs 6, 7, 13 and 14).

Runs 15–28

In these runs, testing was carried out in the presence of a fluid generally known as a poor lubricant. Two pins were machined from each of alloys A, C, E, G, H, K and L. Seven 0.25 inch by 1 inch by 2 inch coupons of 410 stainless steel with 0.015 inch coatings of alloy C were prepared, sintered and ground as in Runs 1–14. Seven blocks, each 0.25 inch by 1 inch by 2 inches and having a 1 inch by 2 inch flat face, were cast of alloy B. One pin of each alloy was rubbed against a coupon with alloy A coating and one of each was rubbed against the flat face of a block. Prior to the rubbing tests, the surface profiles of the coated coupons and blocks were measured with a profilometer. The pins were rubbed on the flat surfaces at 5 feet per minute average velocity while the pin end loading was 1,000 p.s.i. and while the contact area was submerged in water. The system was operated at room temperature until constant friction was shown, requiring on the average about 15 minutes. Thereafter the system was heated to 38° C. and run for 5 minutes at that temperature. At 14° C. intervals, this procedure was repeated through the 93° C. run. At 100° C. the run was continued for 30 minutes while the water boiled. The system was then cooled and the flat face and pin specimens were removed and heated to 149° C. to drive off the water. The flat face profiles of the blocks and coated coupons were measured across the rubbing paths of the pins to determine changes in those surfaces. The visual ratings of the rubbed parts of the flat faces were also determined. Table V shows the sliding couples tested, CLA values of the coated coupons and blocks before and after friction testing, and the visual ratings of the rubbed coupons and block portions after the friction test.

TABLE V

Performance in Water and Steam

| Run No. | Pin Alloy | Flat Face Alloy | CLA Before Test | After Test | Visual Rating |
|---|---|---|---|---|---|
| 15 | A | C | 9.5 | 7.0 | 1 |
| 16 | C | C | 10.0 | 18.5 | 1 |
| 17 | G | C | 9.5 | 8.0 | 2 |
| 18 | E | C | 10.0 | 16.5 | 2 |
| 19 | H | C | 7.5 | 5.5 | 4 |
| 20 | K | C | 7.0 | 9.0 | 1 |
| 21 | L | C | 7.0 | 4.5 | 1 |
| 22 | A | B | 6.0 | 4.0 | 2 |
| 23 | C | B | 6.0 | 5.5 | 1 |
| 24 | G | B | 5.0 | 7.0 | 2 |
| 25 | E | B | 4.0 | 6.0 | 1 |
| 26 | H | B | 7.5 | 5.5 | 2 |
| 27 | K | B | 7.0 | 9.0 | 4 |
| 28 | L | B | 7.0 | 4.5 | 1 |

It can be seen that in sliding friction with a non-lubricating fluid between the sliding surfaces, the surface properties of Laves phase-containing alloys rubbed by Laves phase-containing alloys (Runs 15, 16, 22 and 23) are generally superior to those rubbed by commonly used steels (Runs 17, 18, 24 and 25) or conventional machine construction cobalt based alloys (Runs 19 and 26) and are equivalent and sometimes much superior to those rubbed by commonly used bronzes (Runs 20, 21, 27 and 28).

Runs 29–33

In these runs, testing was carried out in the presence of a relatively poor lubricant. Five pins were machined, one each of alloys A, C and H and two of alloy F. Four, coated, sintered and ground stainless steel coupons, two with alloy A and two with alloy C, were prepared as in Runs 1–14. A 0.25 inch by 1 inch by 2 inch block of alloy H having a 1 inch by 2 inch flat face also was fabricated. For rubbing tests, the pin of alloy A was paired against a coupon coated with alloy A, the pin of alloy C was paired against a coupon coated with alloy C, the pin of alloy H was paired against the block of alloy H and the pins of alloy F were paired against coupons coated with alloy A and alloy C, respectively. Prior to rubbing tests, the flat faces of the coated coupons and block were profile tested with a profilometer. The pins were rubbed on the flat faces at 5 feet per minute average velocity while the pin end loading was 1,000 psi. and while the contact area was submerged in a silicone based hydraulic fluid (available commercially under the name "Versalube" 500). The system was operated at room temperature until its friction was constant. Thereafter, starting at 38° C., the system was operated at each 28° C. temperature increment for 5 minutes until 260° C. was attained. At 260° C. the run was extended for 30 minutes. The system was then cooled and the surface profile of the friction path on each coupon or block was again measured with a profilometer to determine the amount of surface damage produced. The same friction paths were also rated visually.

Table VI shows the sliding couples tested, CLA values of the coated coupons and block before and after friction testing, and the visual ratings of the rubbed coupons and block portions after the friction test.

TABLE VI

Performance in Silicone Fluid

| Run No. | Pin Alloy | Flat Face Alloy | CLA Before Test | After Test | Visual Rating |
|---|---|---|---|---|---|
| 29 | A | A | 9.5 | 10.0 | 1 |
| 30 | F | A | 10.0 | 16.5 | 2 |
| 31 | F | C | 10.0 | 55.0 | 3 |
| 32 | C | C | 11.0 | 11.5 | 3 |
| 33 | H | H | 11.0 | 9.0 | 3 |

It can be seen that under the poor lubrication conditions provided by a silicone oil, the surface properties of Laves phase-containing alloys rubbed by Laves phase-containing alloys (Runs 29 and 32) are equivalent or superior to those same alloys rubbed by a commonly used steel (Runs 30 and 31). The data further show that surface properties of Laves phase-containing alloys rubbed against themselves (Runs 29 and 32) are equivalent to, sometimes much superior to, those of a commonly used wear resistant cobalt based metal against itself (Run 33).

Runs 34–35

In these runs, testing was carried out under high temperature non-lubricating conditions. Two pins were machined, one each of alloy J and alloy C. Two stainless steel coupons with sintered and ground alloy C coatings were prepared as in Runs 1–14. As before, each pin was paired against a coated coupon. Prior to the rubbing test, the coated coupon surfaces were measured with a profilometer. The rubbing tests were run dry at 6 feet per minute average velocity. The initial pin end loading was 500 p.s.i. and the system was operated, first at 316° C. for 30 minutes, then at 649° C. for 30 minutes, then at 982° C. for 30 minutes. At 982° C., the system was operated at 1,500 p.s.i. pin end loading for another 30 minutes and at 3,000 p.s.i. for an additional 30 minutes. The surface profile of the friction path on each coated coupon was again measured with a profilometer to determine the amount of surface damage produced. Table VII shows the sliding couples tested and CLA values of the coated coupons before and after friction testing.

TABLE VII

High Temperature Dry Tests

| Run No. | Pin Alloy | Flat Face Alloy | CLA Before Test | CLA After Test |
|---|---|---|---|---|
| 34 | J | C | 18 | 480 |
| 35 | C | C | 12 | 200 |

The test shows that under high temperature dry conditions, the surface roughness of a Laves phase-containing alloy rubbed against itself (Run 35) is superior to that of a Laves phase-containing alloy rubbed against a nickel based alloy (Run 34) commonly used as a material of construction in sliding applications. A longer service life is indicated.

Runs 36–40

The procedures of Runs 29–33 were repeated except that a hydraulic fluid (a mineral oil containing no additives, having a 100 centistoke viscosity at 38° C., and available commercially under the name "Enerpac" HF 101) was used in place of the silicone fluid and the attained temperature during the test was 204° C. instead of 260° C. Table VIII presents the results.

TABLE VIII

Performance in Hydraulic Fluid

| Run No. | Pin Alloy | Flat Face Alloy | CLA Before Test | CLA After test | Visual Rating |
|---|---|---|---|---|---|
| 36 | A | A | 14.0 | 58.0 | 4 |
| 37 | F | A | 9 | 14 | 4 |
| 38 | F | C | 12.5 | 53.0 | 3 |
| 39 | C | C | 10.0 | 10.0 | 1 |
| 40 | H | H | 9.5 | 290.0 | 4 |

It can be seen that in the presence of this particular fluid, Laves phase-containing alloy C surface rubbed against itself (Run 39) is superior to the same alloy rubbed by a steel surface (Run 38). Laves phase-containing alloy A surface rubbed against itself (Run 36) does not favorably compare to the same alloy rubbed against steel surface (Run 37), but in the presence of other fluids, exemplified in Run 29 by silicone fluid, such a sliding couple is very satisfactory. The surface conditions of both alloys A and C against themselves (Runs 36 and 39) are far superior to those resulting from rubbing a well known conventional cobalt alloy against itself (Run 40).

The embodiments of the invention in which an exclusive property or privilege is claimed are defined as follows:

1. An improved mechanical system comprising a first part presenting a first metallic surface, a second part presenting a second metallic surface of the same or a different metal and capable of being in sliding contact with the first surface, and means for inducing and maintaining the two surfaces in sliding contact with each other, the improvement consisting of employing as each surface a metallic surface comprising an alloy containing at least 60 atom percent of at least two heavy metal transition elements, the ratio of the atomic radii of the largest to the smallest transition elements being 1.05–1.68, and consisting of 10–100 volume percent of a hard phase and 0–90 volume percent of a matrix phase which is softer than the hard phase, said hard phase containing a major fraction of Laves phase in such amount as to provide at least 10 volume percent thereof in the alloy.

2. The system of claim 1 wherein the transition elements of at least one of the alloys are selected from the group consisting of V, Hf, W, Ta, Nb, Mo, Ni, Co, Fe, Mn, Cr, Zr and Ti.

3. The system of claim 2 wherein at least one of the hard phase-containing alloys consists essentially of a substantial amount of at least one metal A, a substantial amount of at least one metal B, and Si, metal A being selected from Mo and W, metal B being selected from Fe, Cr, Co and Ni, the sum of the amounts of A and B being at least 60 atom percent of the alloy.

4. The system of claim 1 wherein the first and second metallic surfaces are of the same composition.

5. The system of claim 1 wherein the first and second metallic surfaces are of different compositions.

6. The system of claim 5 wherein the Laves phases of the alloys of the first and second metallic surfaces have at least one heavy metal transition element in common.

7. The system of claim 1 wherein the alloy of at least one of the surfaces is admixed with a binder which is inert to and softer than the Laves phase of the alloy.

8. The system of claim 7 wherein the binder is Ni.

9. The system of claim 1 wherein at least one of the surfaces has been prepared by employing a plasma arc spray technique.

10. The system of claim 1 wherein at least one of the surfaces has been prepared by employing a powder metallurgical technique.

11. The system of claim 1 wherein at least one of the surfaces has been prepared by employing a casting technique.

12. The system of claim 1 wherein at least one of the surfaces has been prepared by employing a weld overlaying technique.

13. The system of claim 3 wherein the amount of Si and the relative amounts of A and B are such that 20–85 volume percent of hard phase is distributed in 15–80 volume percent of matrix phase.

14. The system of claim 13 wherein the hard phase is substantially all Laves phase.

* * * * *